United States Patent [19]
Minkoff et al.

[11] Patent Number: 6,070,202
[45] Date of Patent: May 30, 2000

[54] REALLOCATION OF POOLS OF FIXED SIZE BUFFERS BASED ON METRICS COLLECTED FOR MAXIMUM NUMBER OF CONCURRENT REQUESTS FOR EACH DISTINCT MEMORY SIZE

[75] Inventors: Ronald M. Minkoff, Plantation; Jerry Lee Albert Sandvos, Davie; Alain D. Abbate, Coral Springs; Timothy A. Monahan-Mitchell, Deerfield Beach, all of Fla.

[73] Assignee: Motorola, Inc., Schaumburg, Ill.

[21] Appl. No.: 09/075,364

[22] Filed: May 11, 1998

[51] Int. Cl.[7] .................................................. G06F 12/00
[52] U.S. Cl. .................................. 710/56; 711/171; 713/1
[58] Field of Search ..................................... 707/202, 206; 709/1, 104; 710/57, 56, 52; 711/147, 148, 149, 150, 151, 152, 153, 170, 171, 172, 173; 713/1

[56] References Cited

U.S. PATENT DOCUMENTS

| | | | |
|---|---|---|---|
| 5,093,912 | 3/1992 | Dong et al. ............................. | 709/104 |
| 5,491,808 | 2/1996 | Geist, Jr. .................................. | 711/100 |
| 5,537,571 | 7/1996 | Deville .................................... | 711/133 |
| 5,559,980 | 9/1996 | Connors et al. ........................ | 711/100 |
| 5,568,635 | 10/1996 | Yamaguchi ............................. | 711/171 |
| 5,625,819 | 4/1997 | Hoffer, Jr. ............................... | 707/202 |
| 5,640,604 | 6/1997 | Hirano ..................................... | 710/56 |
| 5,689,707 | 11/1997 | Donnelly ................................. | 707/206 |
| 5,710,909 | 1/1998 | Brown et al. ........................... | 711/170 |
| 5,784,698 | 7/1998 | Brady et al. ............................ | 711/171 |
| 5,819,061 | 10/1998 | Glassen et al. ......................... | 709/1 |
| 5,835,958 | 11/1998 | Long et al. ............................. | 711/170 |
| 5,949,972 | 9/1999 | Applegate ............................... | 711/154 |

FOREIGN PATENT DOCUMENTS

| | | |
|---|---|---|
| 402082846A | 3/1990 | Japan . |
| 410091515A | 4/1998 | Japan . |

*Primary Examiner*—Thomas C. Lee
*Assistant Examiner*—Albert Wang
*Attorney, Agent, or Firm*—Andrew S. Fuller

[57] ABSTRACT

A computing device (100) has memory (180) subdivided into a first configuration of pools of fixed size memory buffers (188). In response to requests for memory specifying a particular memory size, a fixed size memory of at least the particular size is allocated from the memory area (510, 520). Metrics are collected for each memory request, the metrics including distinct memory sizes based on the particular size requested, and the peak number of concurrent requests for each distinct memory size (530). The memory area is reconfigured as needed into a second configuration of pools of fixed size memory buffers using the metrics collected (540, 550).

18 Claims, 5 Drawing Sheets

FIG.3

| DISTINCT BUFFER SIZES | PEAK NUMBER OF CONCURRENT REQUESTS |
|---|---|
| SIZE 1 | # OF REQUESTS |
| SIZE 2 | # OF REQUESTS |
| SIZE 3 | # OF REQUESTS |
| ⋮ | ⋮ |
| SIZE N | # OF REQUESTS |

| BUFFER POOL | BUFFER POOL EXHAUSTED |
|---|---|
| BUFFER POOL 1 | 1 OR 0 |
| BUFFER POOL 2 | 1 OR 0 |
| ⋮ | ⋮ |
| BUFFER POOL N | 1 OR 0 |

400

REALLOCATION OF POOLS OF FIXED SIZE BUFFERS BASED ON METRICS COLLECTED FOR MAXIMUM NUMBER OF CONCURRENT REQUESTS FOR EACH DISTINCT MEMORY SIZE

TECHNICAL FIELD

This invention relates in general to memory buffer management in computation devices, and more particularly, to the configuration of memory using fixed sized buffer pools.

BACKGROUND OF THE INVENTION

Today's communication devices are generally specialized computing devices, that include such elements as a microprocessor, an operating system, software applications, and other such computational resources. These devices process communication signals in a real time or near real time manner, and thus computational resources must be configured to perform well in this environment. In a typical portable communication device, constraints are imposed by size, power consumption, and cost considerations, that limit how computational and other resources are used within the device. One such resource that must be managed carefully is that of physical memory. The total memory requirements for applications may far exceed the available physical memory, and thus applications tend to share the available physical memory.

The operating system is a program that manages the use of computational resources, such as memory, and other devices. When memory is required by a particular application, the operating system utilizes memory management techniques to allocate memory as needed to the particular application. In one method of memory allocation, the available memory is divided up into pools of fixed length memory buffers. When an application requests memory from the operating system, a memory buffer of an appropriate size is selected from one of the memory buffer pools and allocated to that particular application. When that memory buffer is no longer needed by the application, it is released and made available for subsequent use by that or another application. By organizing the available memory into pools of different size memory buffers, an efficient memory allocation scheme can be maintained that avoids problems such as fragmentation of memory.

Fixed length allocation methods have the advantage of having no memory fragmentation and hence does not require a garbage collection or other similar memory recovery techniques required for variable length allocation methods. As memory recovery can take substantial time and delay operation of certain critical applications, fixed buffer allocation methods are more commonly found in real time operating systems. However, one problem with the use of a fixed size buffer allocation scheme, is that of determining the proper configuration for such memory buffers.

In a typical memory buffer configuration, each pool holds memory buffers of a particular size, and there may be several pools for different memory buffer sizes. For example, a first pool may hold twenty buffers of size one hundred bytes, a second pool may hold ten buffers of size two hundred bytes, a third pool may hold five buffers of size five hundred bytes, and so on. Optimal configuration of the number of buffers in each pool and the buffer size for each pool is difficult to determine and depends on the particular mix of applications executed in a given environment.

The prior art describes a variety of methods in an attempt to address the problem of determining the optimum configuration for fixed size buffer memory allocation. One example is described in U.S. Pat. No. 5,568,635 issued to Yamaguchi on Oct. 22, 1996, for a PHYSICAL MEMORY ALLOCATION SYSTEM, PROGRAM EXECUTION SCHEDULING SYSTEM AND INFORMATION PROCESSOR. In Yamaguchi, a program is run for a fixed period of time so as to determine the memory requirements for the program. The memory requirements so determined are used when executing the program to improve the efficiency of physical memory allocation. In a second example described in U.S. Pat. No. 5,640,604, issued to Hirano on Jun. 17, 1977, for a BUFFER REALLOCATION SYSTEM, buffer allocation to a program is monitored so that a re-allocation of memory is performed when the number of available buffers is smaller than a pre-determined threshold. In a third example described in U.S. Pat. No. 5,093,912, issued to Dong et al. on Mar. 3, 1992, for DYNAMIC RESOURCE POOL EXPANSION AND CONTRACTION IN MULTI-PROCESSING ENVIRONMENTS, resources, such as memory, are allocated for use from a single master pool. The overall pool of available resources is expanded by creating an extension pool and by adding its resources to the master pool. A fourth example is described in U.S. Pat. No. 5,491,808, issued to Geist Jr. on Feb. 13, 1996, for a METHOD FOR TRACKING MEMORY ALLOCATION IN NETWORK FILES SERVER. Here, memory resource allocations and deallocations for a program resident in memory are tracked, and a report generated as to what memory allocations remain unfreed and what, if any, unusual events have occurred in the memory management process. This is done by logging the memory allocation and release calls to the system. Events of allocations without a subsequent release, or releases without a prior allocation are noted for attention by a programmer.

The above mentioned prior art schemes do not adequately address efficiency needs in physical memory allocation for a real time operating system that has to operate with limited memory resources. It is desirable to have a memory management scheme that can better respond to the memory allocation needs of a particular operating environment. Therefore, a new memory buffer management method and apparatus is needed.

BRIEF DESCRIPTION OF THE DRAWINGS

FIG. 3 is a block diagram of memory for collecting metrics on memory buffer usage, in accordance with the present invention.

FIG. 4 is a block diagram of memory for collecting metrics on buffer pool exhaustion, in accordance with the present invention.

DETAILED DESCRIPTION OF THE PREFERRED EMBODIMENT

Generally, the present invention provides for memory buffer configuration management, in a computing device, for memory that is subdivided into pools of fixed size buffers and allocated in response to requests for memory. The memory buffer configuration management is based on metrics collected for each memory request. These metrics are used to reconfigure the memory into a configuration that better suits the operating environment of the computing device. Particularly, a memory allocation system receives requests for memory wherein each request specifies a particular memory size. A fixed size memory buffer of at least the size requested is allocated from memory in response to the request. Metrics are collected and stored for each memory request. The metrics include distinct memory sizes requested, and peak number of concurrent requests for each distinct memory size requested. The metrics are used to reconfigure the memory into another configuration of fixed size memory buffers, such as by increasing the number of buffers for a particular pool, or by adjusting the size of memory buffers in a particular pool. In the preferred embodiment, metrics are also collected on buffers pools having their allocated memory buffers exhausted, and these additional metrics are stored and used for memory reconfiguration. Preferably, the computing device automatically reconfigures memory as needed based on the stored metrics.

Figure 1:
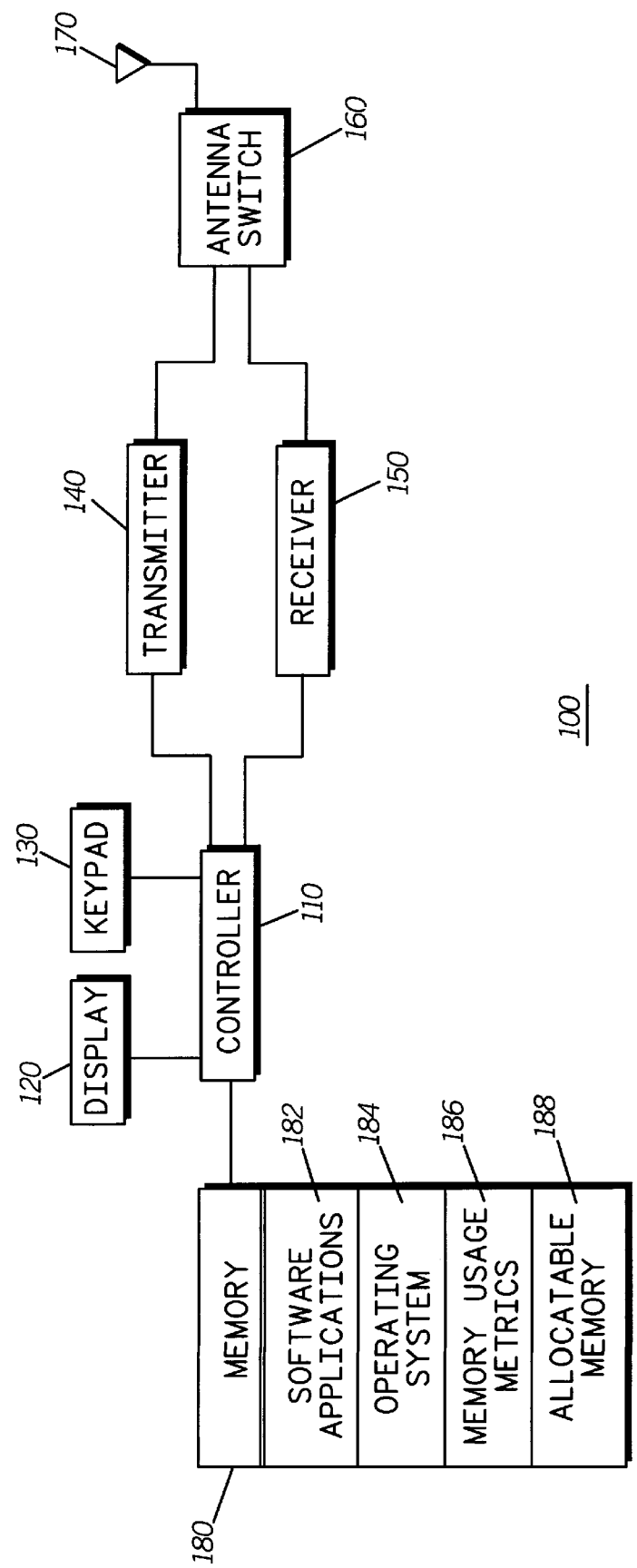
FIG. 1 is a block diagram of a radio communication device in accordance with the present invention.

FIG. 1 is a block diagram of a radio communication device 100 in accordance with the present invention. The radio communication device 100 is a computing device capable of processing wireless communication signals, and can be embodied as a two-way radio, radio-telephone, pager device or the like. The present invention, however, is not limited to an application of communication devices, but has wider applicability in other types of computing devices, particularly, computing devices having a real time operation system and using fixed size memory buffers.

In the preferred embodiment the communication device 100 is a twoway radio telephone having a user interface for presenting information to a user. The radio telephone 100 includes a controller 110 that is coupled to a memory 180, to a transmitter 140, and to a receiver 150, to provide communications circuitry. The transmitter 140 and the receiver 150 are coupled, via an antenna switch 160, to an antenna 170. For transmit operations, the controller 110 configures the antenna switch 160 to couple the transmitter 140 to the antenna 170. Similarly, for receive operations, the controller 110 operates the receiver 150 to process signals obtained via the antenna 170. Receive and transmit operations are conducted under instructions stored in the memory 180. A user interface, comprising a display 120 and a key pad 130, is coupled to the controller 110 to provide access to radio functions and to other information.

In accordance with the present invention, the memory 180 also includes software applications 182, a real-time operating system 184, a memory usage metrics area 186, and allocatable memory 188. The software applications 182 are executed by the controller 110 under the control of the operating system 184, and access the allocatable memory 188 through a memory management process implemented by the operating system.

Figure 2:
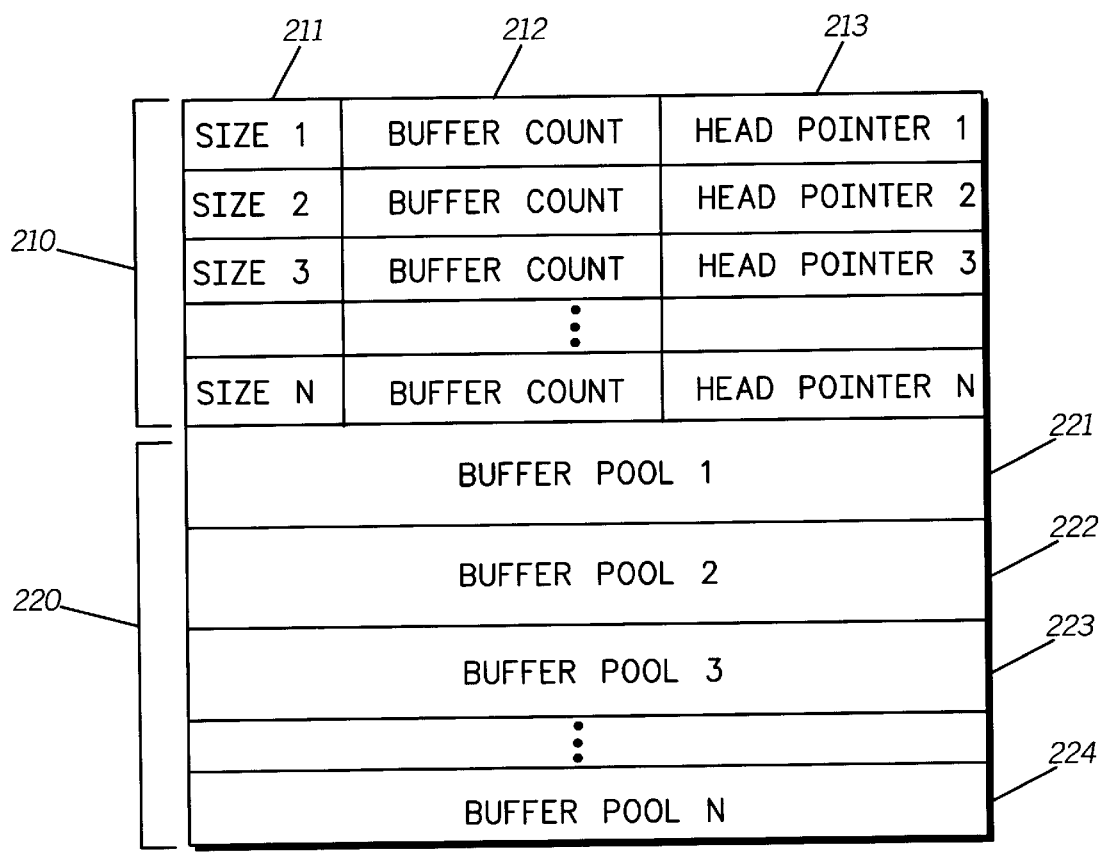
FIG. 2 is a block representation of memory divided into a memory configuration area and a memory buffer pool area, in accordance with the present invention.

FIG. 2 represents allocatable memory 188 that has been divided into a memory configuration area 210, and a memory buffer pool area 220, in accordance with the present invention. The memory configuration area 210 contains a memory buffer size 211, a buffer count 212, and head pointer 213, for each buffer pool. The memory buffer size 211 is fixed for each pool for a particular configuration of memory. The buffer count 212 refers to the number of available buffers for each buffer pool, and the head pointer 213 refers to the starting address of each buffer pool. In the memory buffer pool area 220, separate memory pools 221, 222, 223, 224 are organized, each segmented into one or more separate fixed size memory buffers.

FIGS. 3 and 4 are block diagrams representing the memory usage metrics area 186, in accordance with the present invention. In FIG. 3, a memory block 300 stores the peak number of concurrent requests 320 for each of the distinct memory size tracked 310. In one embodiment, the distinct memory sizes are obtained from each memory request. The distinct memory sizes tracked may represent a range of actual requested memory sizes, or each actual requested memory size. Alternatively, the distinct memory sizes tracked may correspond to buffer sizes in the current memory configuration. A significant aspect of the current invention is that the collected metrics include the peak usage for memory of a particular size or size range, i.e., the maximum number of concurrent requests for the particular buffer size or range. In FIG. 4, a memory block 400 stores a metric 420 for each buffer pool 410 indicating whether or not that buffer pool has had its allocation of memory buffers exhausted during the period for which the metric is collected. In one embodiment, whenever a request is made for a memory buffer from a particular buffer pool, and that particular buffer has no available memory buffers, the buffer pool exhausted indicator is set for that buffer pool. In another embodiment, the peak number of concurrent requests for each buffer pool could be stored, and compared with the number of allocatable memory buffer for each pool to determine this metric. One skilled in the art would readily appreciate that the format for storing the metrics described above may vary without affecting the essence of the information tracked.

Figure 5:
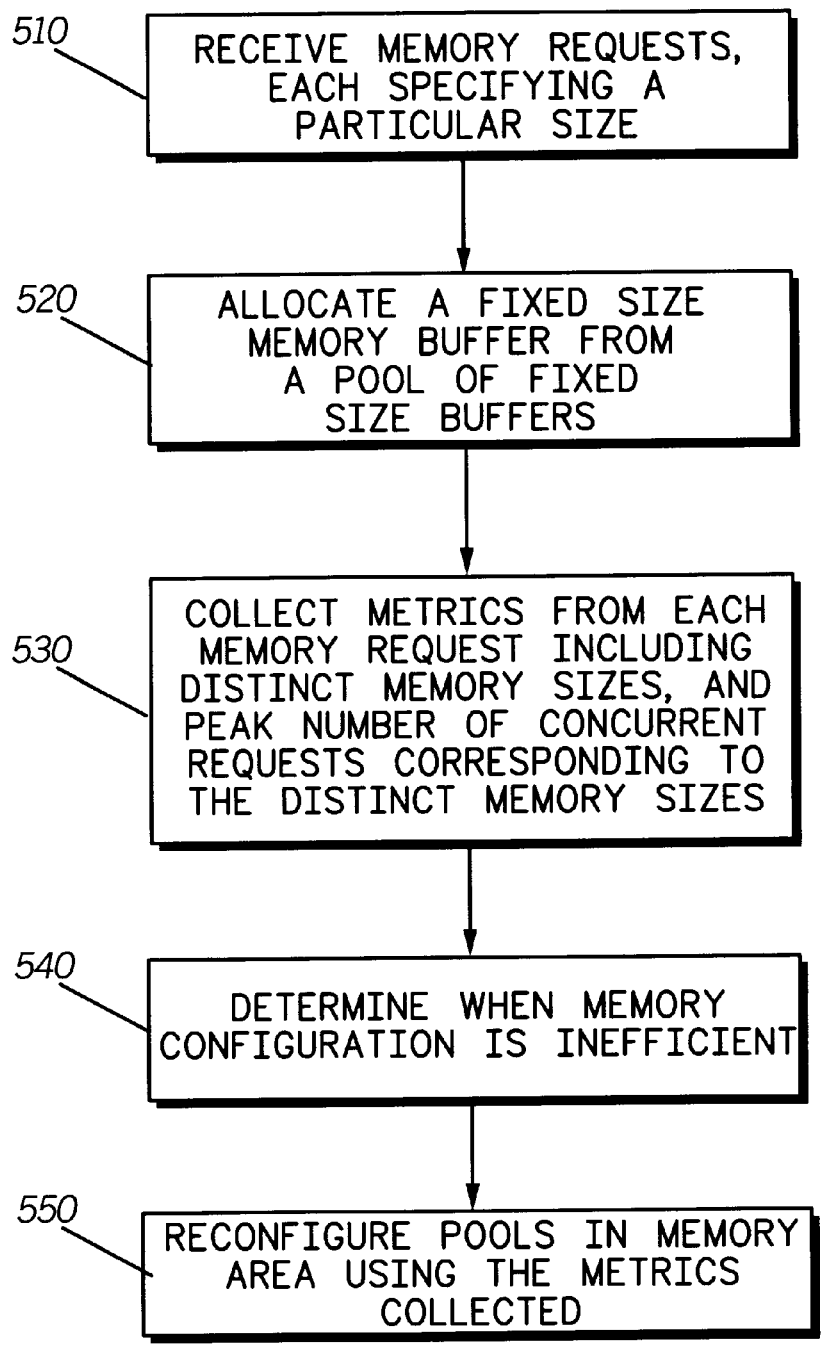
FIG. 5 is a flowchart summarizing procedures for configuration management of memory buffers, in accordance with the present invention.

FIG. 5 is a flowchart summarizing procedures 500 used for configuring memory buffer pools in the radio communication device 100, in accordance with the present invention. As described earlier, the memory in the radio is organized into at least three memory areas, the first being subdivided into pools of fixed size buffers, the second having configuration information for the first memory area, and the third memory area having a portion for storing metrics collected on memory usage of the first area. The memory management process of the operating system receives requests for memory to be allocated from the first memory area as part of the normal operation of software applications running thereon, step 510. Each memory request specifies a particular memory size, and this memory size is used to allocate a fixed size memory buffer from the memory area in response to the memory request, step 520. The fixed size memory buffer is preferably allocated from a pool of memory buffers having the particular size requested. However, if, there are no available memory buffers of the particular size requested, then a buffer of the next higher size available is allocated such that the memory buffer allocated has at least the size requested. The memory management system collects metrics for each memory request, step 530. The metrics include distinct memory sizes associated with the request. The distinct memory size tracked correspond to the actual size requested, the next highest buffer size in the current configuration of memory, or to a particular range that includes the actual size requested. The metrics also include the maximum or peak number of concurrent requests for each distinct memory size tracked, step 530. Preferably, metrics are also collected on which pools of fixed memory sized buffers have been exhausted during the period for which metrics are being collected. The metrics collected are stored in non-volatile memory of the radio and made available for reconfiguration operations. When it is determined that the current memory configuration is inadequate, step 540, the memory configuration for the memory buffer pool is altered, step 550. Thus, the memory area is reconfigured into a different configuration of pools of fixed sized memory buffers using the metrics collected. The new configuration information is stored in second memory area, i.e., the memory configuration area.

In reconfiguring the memory area, the number of memory buffers of a particular size or the number of pools of different sizes may be changed so as to reflect the configuration needs of the operating environment. Reconfiguration of the memory area may also include allocating an increase in number of memory buffers for particular pools of fixed memory buffers that have been identified as having their allocated number of memory buffers exhausted. In one embodiment, the reconfiguration process is manual, requiring the intervention of a programmer or other external configuration mechanism. In another embodiment, reconfiguration is automatically performed by the computing device at an appropriate time during normal operation, such as part of a power up sequence or as part of a power down sequence.

Figure 6:
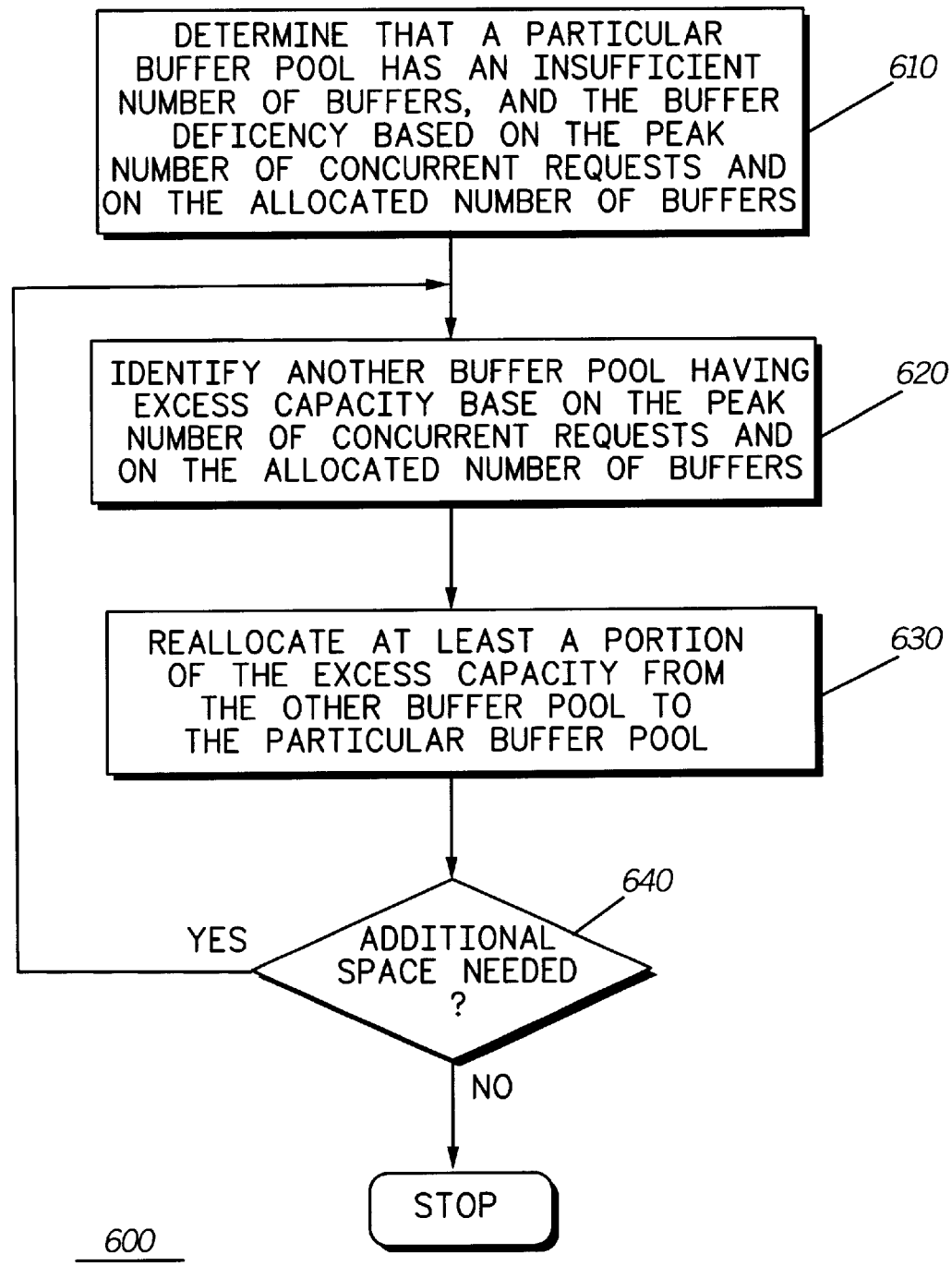
FIG. 6 is a flowchart summarizing procedures used for reconfiguring pools of memory buffers, in accordance with the present invention.

FIG. 6 is a flowchart summarizing procedures 600 used for automatic reconfiguring buffer pools for a computing device. The stored metrics are analyzed to determine whether reconfiguration is necessary. The computing device determines that a particular buffer pool has an insufficient number of buffers based on the peak number of concurrent requests and the allocated number of buffers for the particular buffer pool, step 610. The actual deficiency is also determined by comparing the peak number of concurrent requests and the allocated number of buffers for the particular buffer pool. The computing device then identifies another buffer pool having excess capacity based on the peak number of concurrent requests and the allocated number of buffers for that other buffer pool, step 620. At least a portion of the excess capacity is reallocated from the other buffer pool to the particular buffer pool, step 630. If additional buffers are needed, the process is repeated by identifying other buffer pools with excess capacity, steps 640, 620, 630.

The present invention offers significant advantages over the prior art. Real time systems that have memory allocation based on fixed size buffers can dynamically and automatically respond to changes in memory configuration needs. The particular metrics tracked enable reconfiguration to be made in an efficient and logical manner.

While the specification concludes with claims defining the features of the invention that are regarded as novel, it is believed that the invention will be better understood from a consideration of the following description in conjunction with the drawing figures, in which like reference numerals are carried forward.

What is claimed is:

1. In a computing device having a memory area subdivided into a first configuration of pools of fixed size memory buffers, a method comprising the steps of:

receiving a plurality of memory requests for memory from the memory area, each memory request specifying a particular memory size;

allocating a fixed size memory buffer from the memory area in response to each memory request, the fixed size memory buffer having a size of at least the particular size;

collecting metrics for each memory request, the metrics including distinct memory sizes based on the particular size requested, and maximum number of concurrent requests for each distinct memory size, wherein the collection of metrics on maximum number of concurrent requests is independent of the number of fixed size memory buffers in any of the pools of fixed size memory buffers; and reconfiguring the memory area into a second configuration of pools of fixed size memory buffers using the metrics collected.

2. The method of claim 1, wherein:

the step of collecting metrics comprises the step of identifying particular pools of fixed size memory buffers that have been exhausted; and the step of reconfiguring the memory area comprises the step of allocating an increase in number of memory buffers for the particular pools of fixed size memory buffers identified.

3. The method of claim 1, wherein the step of reconfiguring the memory area comprises the step of the automatically configuring the memory area using the metrics collected during normal operation of the computing device.

4. The method of claim 1, wherein the step of reconfiguring the memory area comprises the step of automatically configuring the memory area using the metrics collected as part of a power up sequence.

5. The method of claim 1, wherein the step of reconfiguring the memory area comprises the step of automatically configuring the memory area using the metrics collected as part of a power down sequence.

6. A method for memory management in a computing device, the method comprising the steps of:

organizing memory in the computing device into at least first, second, and third memory areas, the first memory area being subdivided into pools of fixed size buffers, the second memory area having configuration information for the first memory area, and the third memory area having a metrics storage portion;

collecting metrics on memory usage of the first memory area, the metrics including distinct memory size requests and peak number of concurrent requests for each of the distinct memory size requests, wherein the collection of metrics on peak number of concurrent requests is independent of the number of fixed size memory buffers in any of the pools of fixed size memory buffers;

storing the metrics in the third memory area;

reconfiguring the first memory area using the metrics stored in the third memory area, including the steps of:
generating new configuration for the first memory area; and
storing the new configuration in the second memory area.

7. The method of claim 6, wherein the step of reconfiguring the first memory area comprises the step of adjusting buffer size for existing buffer pools based on the distinct memory size requests and peak number of concurrent requests for each of the distinct memory size requests.

8. The method of claim 6, wherein:

the step of collecting metrics comprises the step of identifying particular pools of fixed size buffers for which an allocated number of memory buffers have been exhausted; and the step of reconfiguring the first memory area comprises the step of increasing the allocated number of memory buffers for the particular pools of fixed size buffers identified.

9. The method of claim 6, wherein the step of reconfiguring the first memory area comprises the step of the automatically configuring the first memory area during normal operation of the computing device.

10. The method of claim 6, wherein the step of reconfiguring the first memory area comprises the step of the automatically configuring the first memory area, as part of a power up sequence.

11. The method of claim 6, wherein the step of reconfiguring the first memory area comprises the step of automatically configuring the first memory area, as part of a power down sequence.

12. The method of claim 6, wherein the step of reconfiguring the first memory area comprises the steps of:
   determining that a particular buffer pool has an insufficient number of buffers based on a peak number of concurrent requests stored as a metric, and based on an allocated number of buffers for the particular buffer pool;
   determine an actual deficiency for the particular buffer pool by comparing the peak number of concurrent requests stored with the allocated number of buffers for the particular buffer pool;
   identifying another buffer pool having excess capacity based on the peak number of concurrent requests and the allocated number of buffers for that other buffer pool; and
   reallocating at least a portion of the excess capacity from the other buffer pool to the particular buffer pool.

13. The method of claim 6, wherein the metrics of peak number of concurrent requests is independent of the number of fixed size buffers in any of the pools of fixed size buffers.

14. The method of claim 6, wherein the step of collecting includes the step of tracking at least one peak number of concurrent requests for at least one distinct memory size that does not match the size of a fixed size buffer in any of the pools of fixed size buffers.

15. A computing device, comprising:
   a memory subdivided into first, second, and third areas, a first area being subdivided into pools of fixed size memory buffers, and a second area having configuration information for the first area, and a third area having metrics on usage of the first area; and
   a real-time operating system that is responsive to requests for memory from the first area, to collect and store the metrics from the requests for memory in the third area, wherein the metrics include distinct memory sizes associated with requests for memory from the first area, and peak number of concurrent requests corresponding to each of the distinct memory sizes, which peak number of concurrent requests is independent of the number of fixed size memory buffers in any of the pools of fixed size memory buffers.

16. The computing device of claim 15, further comprising a memory block in the third area that stores data indicating which pools have had their memory buffers exhausted.

17. The method of claim 15, wherein the peak number of concurrent requests for at least one metric exceeds the number of buffers allocated for any of the pools of fixed size memory buffers.

18. The method of claim 15, wherein at least some of the distinct memory sizes are distinct from the size of buffers in any of the pools of fixed size memory buffers.

* * * * *